United States Patent
Lee

(10) Patent No.: US 10,311,642 B2
(45) Date of Patent: Jun. 4, 2019

(54) AUGMENTED REALITY SERVICE METHOD AND SYSTEM FOR COLORING PLAY

(71) Applicant: DS GLOBAL, Seoul (KR)

(72) Inventor: Sam Hee Lee, Bucheon-si (KR)

(73) Assignee: DS GLOBAL, Seoul (KR)

( * ) Notice: Subject to any disclaimer, the term of this patent is extended or adjusted under 35 U.S.C. 154(b) by 0 days.

(21) Appl. No.: 15/578,495

(22) PCT Filed: May 30, 2016

(86) PCT No.: PCT/KR2016/005697
§ 371 (c)(1),
(2) Date: Nov. 30, 2017

(87) PCT Pub. No.: WO2016/195348
PCT Pub. Date: Dec. 8, 2016

(65) Prior Publication Data
US 2018/0137683 A1   May 17, 2018

(30) Foreign Application Priority Data

Jun. 3, 2015   (KR) .................. 10-2015-0078714

(51) Int. Cl.
*G06T 19/00* (2011.01)
*G06T 7/90* (2017.01)
(Continued)

(52) U.S. Cl.
CPC ........... *G06T 19/006* (2013.01); *G06Q 50/10* (2013.01); *G06T 7/90* (2017.01); *G06T 11/001* (2013.01);
(Continued)

(58) Field of Classification Search
USPC ..................................................... 345/589
See application file for complete search history.

(56) References Cited

U.S. PATENT DOCUMENTS

2012/0069051 A1*   3/2012   Hagbi ................... G06T 19/006
                                                          345/633
2016/0189397 A1*   6/2016   Mullins ..................... G06T 7/90
                                                          345/633
(Continued)

FOREIGN PATENT DOCUMENTS

KR       20020014078        2/2002
KR       20050114142       12/2005
(Continued)

OTHER PUBLICATIONS

Culture Technology (CT) Trend: Image, Picture drawn on a piece of paper is implemented into a 3D animation, colAR, 2014, pp. 82-87.
(Continued)

*Primary Examiner* — Wesner Sajous
(74) *Attorney, Agent, or Firm* — Cantor Colburn LLP

(57) ABSTRACT

An augmented reality service method for a coloring play according to the present invention comprises the steps of: 1) executing a service application, and selecting and downloading an image to be colored from a server by a user terminal; 2) coloring the downloaded image in a specific pattern, using tool provided by the service application; 3) printing the colored image; 4) executing the service application, scanning a printed material of the colored image so as to recognize a marker, and extracting color information according to coordinates of the image; 5) coloring an augmented reality content provided by the server according to the extracted color information, so as to generate a colored augmented reality content on the basis of the image colored by a user; and 7) displaying the colored augmented reality content on a display unit of the user terminal.

8 Claims, 5 Drawing Sheets

(51) Int. Cl.
- *H04N 1/00* (2006.01)
- *H04N 1/60* (2006.01)
- *G06Q 50/10* (2012.01)
- *H04N 1/46* (2006.01)
- *G06T 11/00* (2006.01)
- *G06T 11/60* (2006.01)

(52) U.S. Cl.
CPC .............. *G06T 11/60* (2013.01); *G06T 19/00* (2013.01); *H04N 1/00108* (2013.01); *H04N 1/00307* (2013.01); *H04N 1/46* (2013.01); *H04N 1/60* (2013.01); *G06T 2207/10008* (2013.01); *G06T 2207/30204* (2013.01); *G06T 2219/2012* (2013.01)

(56) References Cited

U.S. PATENT DOCUMENTS

2016/0343173 A1* 11/2016 Mullins .................. G06F 3/011
2018/0212684 A1*  7/2018 Aoyama .............. H04B 10/541

FOREIGN PATENT DOCUMENTS

| KR | 20120046605 | 5/2012 |
| KR | 101440766 | 9/2014 |
| KR | 20140148061 | 12/2014 |

OTHER PUBLICATIONS

International Search Report—PCT/KR2016/005697 dated Aug. 19, 2016.

\* cited by examiner

AUGMENTED REALITY SERVICE METHOD AND SYSTEM FOR COLORING PLAY

TECHNICAL FIELD

The present invention relates to an augmented reality service method and system for coloring play and, more particularly, to an augmented reality service method and system for coloring play, which color an image in a service app without coloring a printed matter, recognize the mark of a printed matter, and execute an augmented reality service corresponding to the image colored by a user.

BACKGROUND ART

Recently, as the spread of smartphones is rapidly increased and the time taken to use the smartphone is greatly increased for several years, the number of applications (hereinafter referred to as "service apps") of the smartphones is incalculably developed in various ways and is evolving, thereby providing a lot of convenience through ideas useful in real life.

An augmented reality service app is one of the apps. Marker-based augmented reality from augmented reality-related technologies is a method of augmenting a specific object on a previously installed marker (a specific pattern or an image). The marker-based method is one of methods that are frequently used due to an advantage capable of precisely augmenting a specific object in a corresponding place. The marker-based method has a disadvantage in that an error of recognition is generated in detecting a marker if the marker is covered or a camera rapidly moves. In order to supplement the disadvantage, however, a correction method additionally using an acceleration sensor provided by a mobile device is also researched.

ColAR Mix is one of marker-based augmented reality services now being provided as smartphone apps. ColAR Mix is an augmented reality service provided for coloring play, and can develop the creative ability of children.

A user who tries to use ColAR Mix accesses a ColAR Mix server using a computer (for example, a PC), downloads a painting draft, and outputs a printed matter of A4 paper using a printer.

Furthermore, when the output paper printed matter (for example, a robot) is colored with a desired color, the service app (for example, ColAR Mix) is executed, and the output paper printed matter is matched with a smartphone screen, the user can view that the robot colored by the user appears in the smartphone screen in a 3D form and the robot moves and behaves.

This is described in more detail. A server stores a variety of types of images for coloring play and augmented reality content corresponding to the corresponding images.

When a specific marker is recognized by a user terminal, augmented reality content corresponding to a corresponding image appears in a 3D form, moves and behaves.

More specifically, when a user colors a printed matter in a specific pattern, executes a service app, and scans the printed matter of the colored image, color information according to the coordinates of the image is extracted. Colors are combined with augmented reality content provided by the server based on the extracted color information, thereby generating colored augmented reality content.

Accordingly, the user can view that the image colored by the user appears, moves and behaves through the display unit of the user terminal.

Conventionally, in the case of an augmented reality service provided for coloring play, such as ColAR Mix, a user had to access a server through his own computer (for example, a PC), download a desired image, and output (print) the downloaded image in the form of a paper printed matter. Furthermore, there was a need for a task for coloring the output paper printed matter using various writing supplies.

As described above, conventional procedures for service execution may provide children with a creative ability and interest because they color the painting draft of a paper printed matter, but are tasks that are inconvenient, time-consuming and cumbersome for adults who want everything to be solved by a single smartphone.

Furthermore, there is a problem in that color pencils, paints and brushes of various colors must be separately provided because an output matter must be directly colored.

Furthermore, since an image is commonly printed on A4 paper and colored, a marker is not easily recognized in a screen of a user terminal because the area of the printed matter scanned by the user terminal is large.

DISCLOSURE

Technical Problem

The present invention has been made to solve the above problems, and an object of the present invention is to provide an augmented reality service method and system for coloring play, which color an image in a service app without coloring a printed matter, recognize the mark of a printed matter, and execute an augmented reality service corresponding to the image colored by a user.

Another object of the present invention is to provide an augmented reality service method and system for coloring play, which can also playback the voice file of a user when executing augmented reality content.

Technical Solution

In order to achieve the above objects, an augmented reality service method for coloring play according to the present invention includes the steps of 1) executing, by a user terminal, a service app and selecting and downloading an image to be colored from a server; 2) coloring the downloaded image in a specific pattern using a tool provided by the service app; 3) printing the colored image; 4) executing the service app, recognizing a marker by scanning the printed matter of the colored image, and extracting color information according to the coordinates of the image; 5) generating coloring augmented reality content based on the image colored by a user by coloring augmented reality content provided by the server based on the extracted color information; and 7) displaying the coloring augmented reality content on the display unit of the user terminal.

Furthermore, it is preferred that the step of storing the image colored in the step 2) in the user terminal is added.

Furthermore, it is preferred that the coloring augmented reality content is generated in the server or the user terminal.

Furthermore, it is preferred that in the step 3), the image colored by the user is colorfully printed.

Furthermore, it is preferred that the step 2) includes generating, by the user, a voice file and transmitting the voice file to the server and the step 7) includes playing back the voice file when the coloring augmented reality content is displayed on the display unit of the user terminal.

An augmented reality service system for coloring play according to the present invention includes a server providing various images for coloring play and augmented reality content corresponding to a corresponding image; a user terminal including a service app for downloading the image in response to the selection of a user and providing a tool for allowing the user to color the image; and a printing device printing the image colored in the service app. The service app recognizes a marker by scanning the printed matter of the colored image and extracts color information according to the coordinates of the image. The server or the service app generates coloring augmented reality content based on the image colored by the user by coloring augmented reality content provided by the server based on the extracted color information. The user terminal displays the coloring augmented reality content.

Furthermore, the user terminal stores the image colored by the user in the service app.

Furthermore, the printing device includes short-distance wireless communication means, receives the colored image from the user terminal, and colorfully prints the received image.

Advantageous Effects

In accordance with the present invention, there is an effect in that in an augmented reality service for coloring play, an image can be colored on a screen of a user terminal in a service app without coloring a printed matter, the mark of a printed matter can be recognized, and an augmented reality service corresponding to the image colored by a user can be enjoyed.

Accordingly, there is an advantage in that various digitalized editing functions provided by a service app can be used.

Furthermore, a printed matter is output in a size smaller than A4. Accordingly, when augmented reality content is executed, a user can easily view the printed matter while rotating it.

In addition, there is an effect in that the voice file of a user can also be played back when augmented reality content is executed.

BEST MODE FOR INVENTION

The point of the present invention is to provide an augmented reality service in order to make coloring play more interested, and is to implement a method and system, which generate and execute coloring augmented reality content by executing a service app in a user terminal such as a smartphone, downloading an achromatic color image, coloring the image, outputting the colored image in colors, and coloring achromatic coloring augmented reality content provided by a server in the same color as the image colored by the user.

Figure 1:
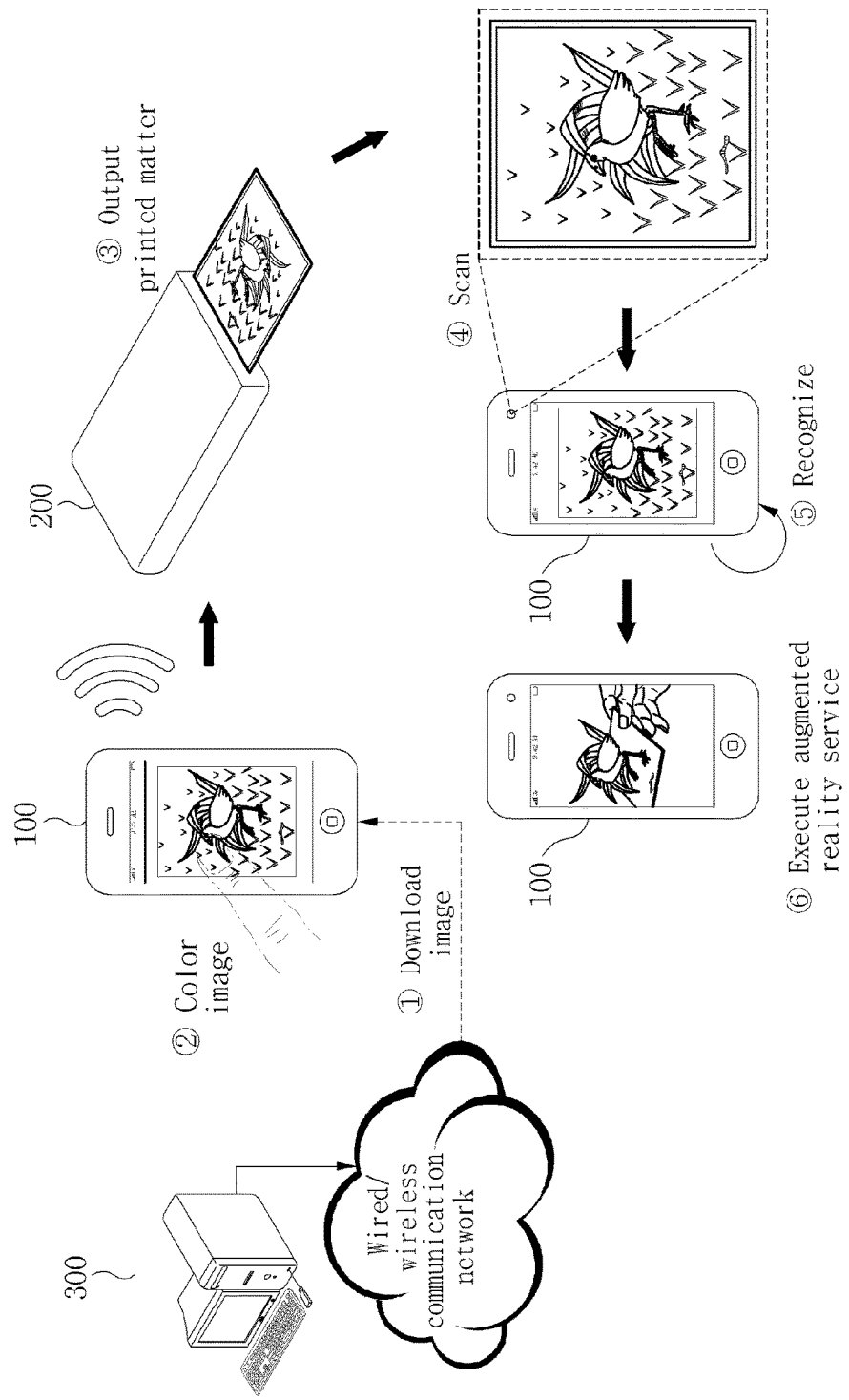
FIG. 1 is a block diagram of an augmented reality service system according to the present invention.

FIG. 1 is a block diagram of an augmented reality service system according to the present invention.

As shown in FIG. 1, the augmented reality service system according to the present invention is configured to include a user terminal 100 such as a smartphone, a printing device 200 and a server 300.

The server 300 stores and manages achromatic color images for coloring play and a variety of types of augmented reality content for an augmented reality service (for example, ColAR Mix) corresponding to the images, and provides stored images to the terminal 100 when the user terminal 100 accesses and executes the service app.

When the augmented reality service app is executed, the user terminal 100 accesses the server 300 and downloads an achromatic color image requested by a user. Furthermore, the user terminal 100 adds or edits a color or line or text to the downloaded image in response to the user's input.

Furthermore, the user terminal 100 may receive a voice signal from the user and associate the voice signal with the downloaded image. When the corresponding augmented reality service is executed, the voice file associated with the image is output along with the augmented reality service. Accordingly, the user can store and keeps the voice file along with coloring play and provide and transfer the voice file to a thirty party along with the output printed matter of a colored image. Accordingly, the third party who has received the voice file and the printed matter may execute the marker of the printed matter, may execute the augmented reality content, and may simultaneously listen to the voice message of the user.

When the printed matter of the image is output through the printing device 200, the user terminal 100 recognizes the marker and the colors of each of the portions of the image by scanning the printed matter, and executes an augmented reality service corresponding to the image. When the augmented reality service is executed, a 3D-shaped object into which the editing of the color or line has been incorporated is spread on the image on the display unit of the terminal 100. The user can stereoscopically view the 3D-shaped object spread on the image while rotating the printed matter of the image. In other words, the service app is executed, the marker is recognized by scanning the printed matter of the colored image, and color information according to the coordinates of the colored image is extracted. Coloring augmented reality content is generated based on the image colored by the user by coloring achromatic coloring augmented reality content provided by the server based on the extracted color information. The coloring augmented reality content based on the extracted color information may be generated in the service app of the user terminal, but the color information may be transmitted to the server and the server may generate the coloring augmented reality content.

The user terminal 100 may be a notebook computer (for example, a tablet PC) or a mobile communication terminal (for example, a mobile phone, PDA or smartphone). The user terminal 100 may include a wireless communication unit, an audio/video (A/V) input unit, a user input unit, a sensing unit, an output unit, memory, an interface unit, a camera module, a control unit, a power supply unit and so on. The elements are not essential, and the user terminal may be a mobile terminal having more elements than the aforementioned elements or less elements than the aforementioned elements. The wireless communication unit includes a short-distance wireless communication module, such as Bluetooth, radio frequency identification (RFID), infrared data association (IrDA), ultra wideband (UWB), Zigbee (IEEE 802.15.4) and Wi-Fi, transfers image data to the printing device 200 through the short-distance wireless communication module, and performs the output of a printed matter.

The user terminal 100 may install software or an app (for example, an augmented reality service app) that performs an augmented reality service according to the present invention, or may store the software or app in memory. A user may download the augmented reality service app from the server 300 or an application store (hereinafter referred to as an "app store") and install the downloaded service app in the terminal 100.

The printing device 200 is a portable print or printing device designed by taking into consideration a small size and portability in priority, and receives an image from the user terminal 100 through the short-distance wireless communication means. Furthermore, the printing device outputs (prints) the color printed matter of the received image. The short-distance wireless communication means is for communication with the user terminal 100, and may perform a short-distance wireless communication protocol, such as Bluetooth, radio frequency identification (RFID), infrared data association (IrDA), ultra wideband (UWB), Zigbee (IEEE 802.15.4) and Wi-Fi.

Figure 2:
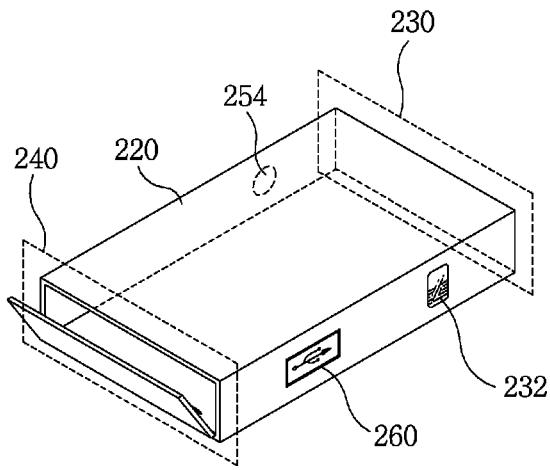
FIG. 2 is a perspective view of a printing device according to the present invention.

As shown in FIG. 2, the printing device 200 is configured to include a main body unit 220, a printing paper feeding unit 230, a printing paper discharge unit 240, a power supply unit 250 and a connection port unit 260.

The main body unit 220 is a case that forms the body of the printing device 200, and provides a base on which the printing paper feeding unit 230, the printing paper discharge unit 240, the power supply unit 250 and the connection port unit 260 can be mounted (or formed).

The printing paper feeding unit 230 is a device stage that supplies paper necessary for the printing of the printing device 200, and is configured to include a paper check window 232, a cartridge (not shown) and an insertion hole (not shown). The paper check window 232 is provided on one side of the main body unit 220, and a user can check the amount of printing paper remaining in a cartridge tray through the paper check window 232.

The printing paper discharge unit 240 is a device stage for discharging paper printed by the printing device 200, and is configured to include a discharge port, a cover unit and a cover hinge.

The power supply unit 250 controls the on/off of the printing device 200 and supplies power to electrical/electronic devices forming the printing device 200, and is configured to include a power button 254 and a battery (not shown). The power button 254 is provided on one side of the main body unit 220, and controls the on/off of the printing device 200 in response to a user's manipulation that pushes the power button 254.

The connection port unit 260 is provided on one side (for example, the left or right) of the main body unit 220 and to include a USB connection port (not shown) and a charger connection port (not shown).

The printing device 200 according to the present invention includes the connection port unit 260, and may perform wired data transmission between the printing device 200 and an external device (for example, a smartphone or a notebook, such as a tablet PC) in a wired manner through the USB connection port in addition to a wireless connection (for example, short-distance wireless communication) with the user terminal 100. Furthermore, the printing device 200 is supplied with power through a charger connection port 268 so that the battery 258 is charged.

Furthermore, in the printing device according to the present invention, paint has been coated on printing paper. The printing device is a zero ink type in which full colors are implemented by applying heat of a specific temperature to printing paper for a specific time in the printing device.

Furthermore, the size of the printing paper (printed matter) is preferably 4 inches×6 inches or less, that is, a common photo size. When augmented reality content is executed, a printed matter can be seen at various angles while moving it. The reason for this is that the A4 size is too big in order to move a printed matter and is also that if the size of a printed matter is too big, it is not easy to recognize a marker due to a smartphone having a display unit of a relatively small area.

Figure 3:
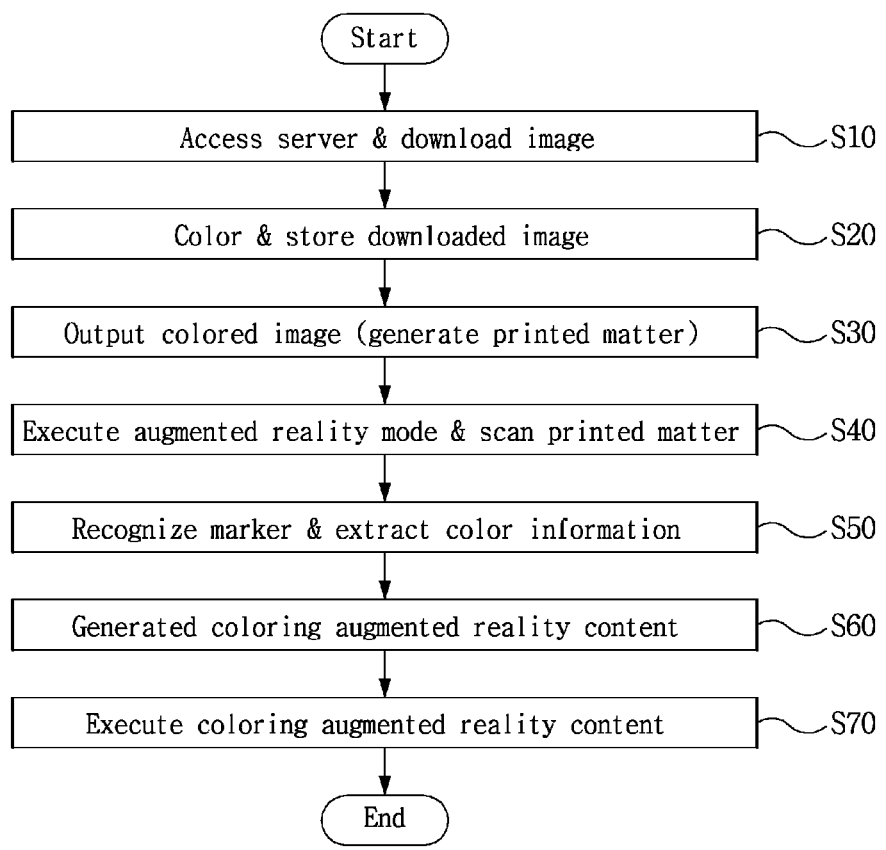
FIG. 3 is an operational flowchart showing an augmented reality service method according to the present invention.

FIG. 3 is an operational flowchart showing an augmented reality service method according to the present invention, and shows a method and procedure for providing an augmented reality service.

In the present invention, after an image is colored using an augmented reality service app (hereinafter referred to as a "service app") and output as a printed matter, the output printed matter is scanned so that an augmented reality service screen is displayed in the terminal 100 (for example, a smartphone or tablet PC).

Figure 4:
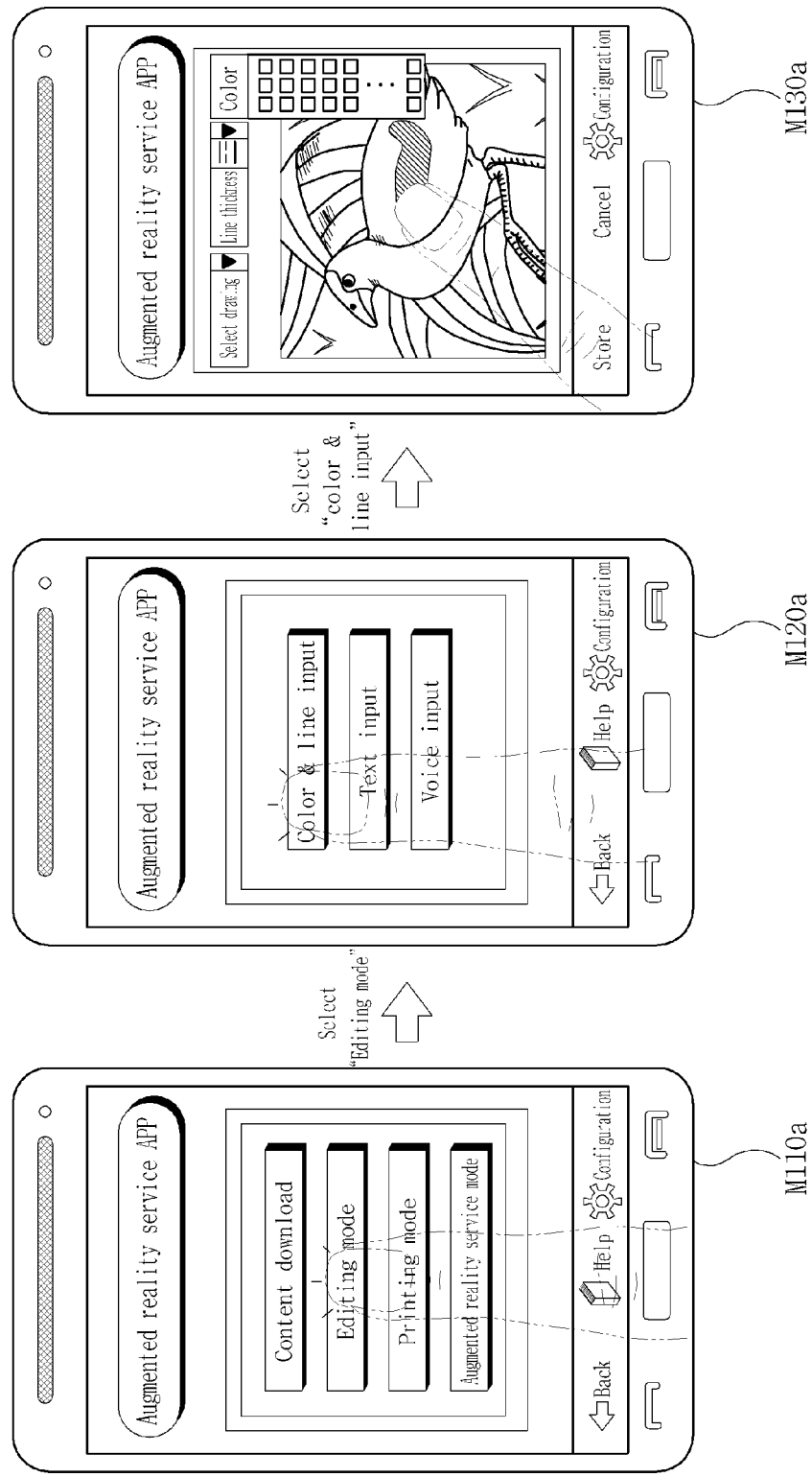
FIG. 4 is an exemplary diagram showing a procedure of coloring a downloaded image in accordance with the present invention.

When a user executes the service app stored in the terminal 100, the main screen M110a of the app is displayed in response to the execution of the app, as shown in FIG. 4.

When the main screen M110a of the app is displayed in the terminal 100, the user first accesses the server 300 by selecting (touching) a "content download" button. Furthermore, in the accessed server 300, an image (for example, animals and plants, an animation character or a robot) selected by the user is downloaded (S10). In this case, the image is for executing an augmented reality service and includes a marker (a specific pattern or image) capable of augmenting a specific object in the image. FIG. 4 is an exemplary diagram showing a procedure of coloring a downloaded image in accordance with the present invention.

Thereafter, when the downloading of the selected image is completed, in order to color the image or input text to the image, the user first selects (touches) an "editing mode" button in the main screen M110a of the app. In response thereto, the sub-menu screen M120a of the editing mode, including sub-items such as "color & line input", "text input" and "voice input", is displayed. The user may select the "color & line input" item of the sub-menu screen M120a and color the image.

The user may color the downloaded image or input a line (or drawing) to the downloaded image through an editing screen shown in a screen M130a of FIG. 4. Furthermore, when the coloring (editing) is completed, the user stores the corresponding image (S20). More specifically, in accordance with the present invention, a printed matter is not colored using a color pencil or paints, but the printed matter can be easily colored (edited) using a tool provided by the service app. That is, the service app can provide an image editing tool used in a known image editing program (for example, "Photoshop").

A voice file may be generated according to circumstances and transmitted to the server.

Thereafter, the user may output (print) the edited color image to the printing device 200 wirelessly connected to the user terminal 100 by selecting (touching) the "print mode" button in the main screen M110a of the app as shown in FIG.

Figure 5:
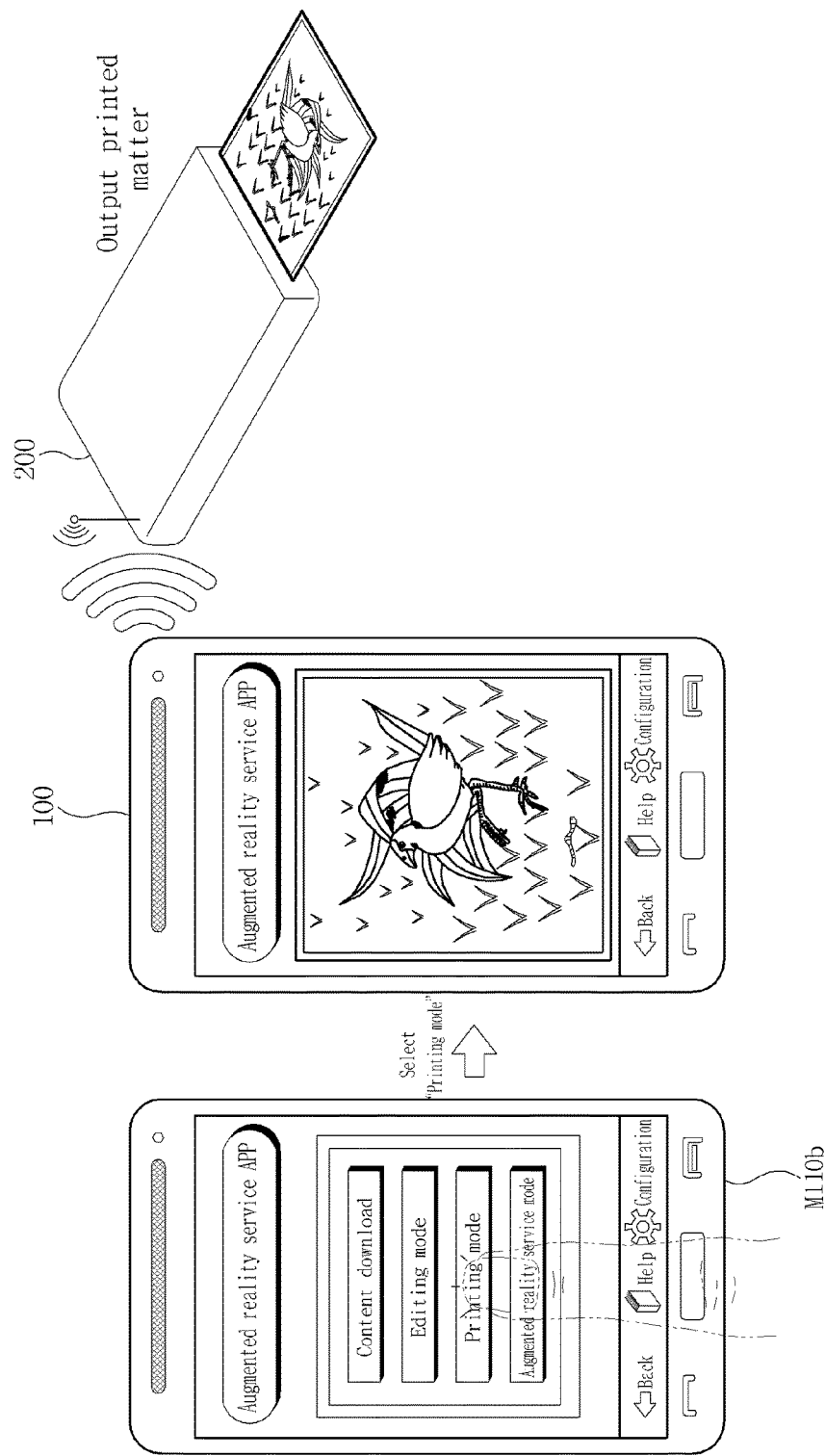
FIG. 5 is an exemplary diagram showing a procedure of outputting an image to a printing device in accordance with the present invention.

5 (S30). FIG. 5 is an exemplary diagram showing a procedure of outputting an image to the printing device in accordance with the present invention.

Figure 6:
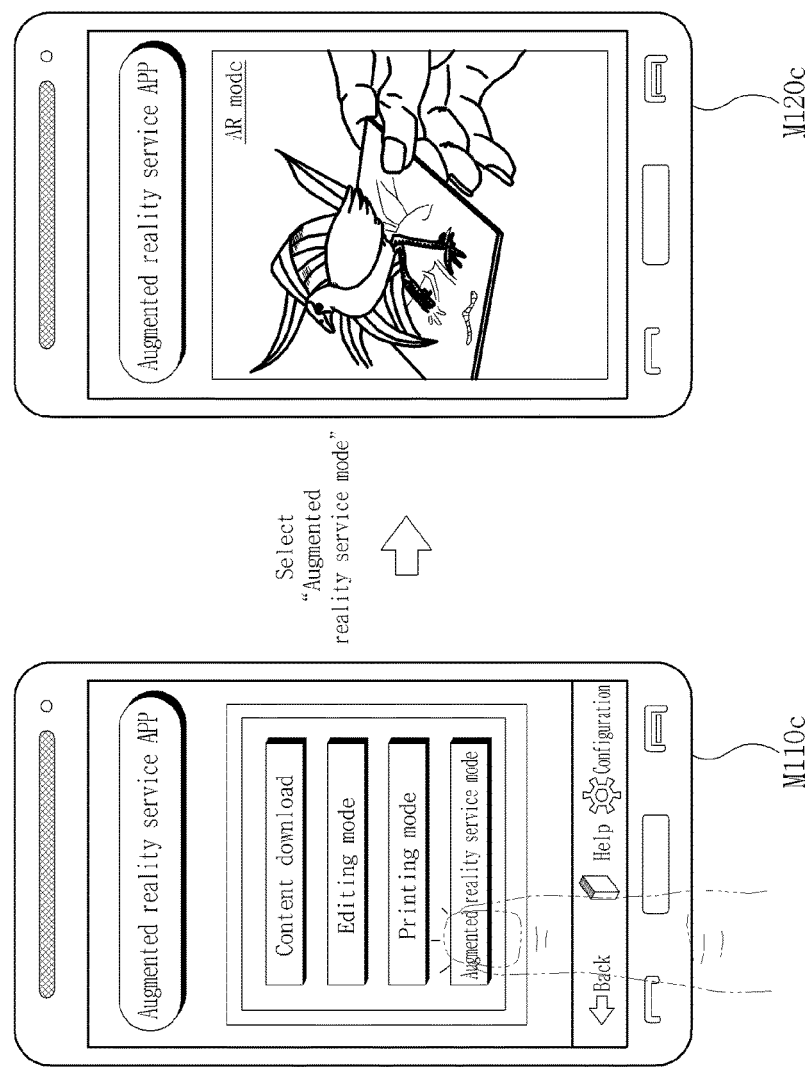
FIG. 6 is an exemplary diagram showing an augmented reality service according to the present invention.

When the color image is output to the printing device 200, the user executes an augmented reality mode by selecting (touching) an "augmented reality service mode" button in the main screen M110a as shown in FIG. 6, adjusts the direction of the terminal 100 toward the color image so that the entire output color image is located within a terminal screen, and constantly maintains the distance from the color image.

When the augmented reality mode is executed, the terminal 100 drives a camera module so that the color image is displayed on the terminal screen, and scans the output printed matter of the color image (S40). While the scanning is performed, the terminal 100 recognizes a marker and the colors of each of the portions of the color image. That is, the terminal 100 extracts color information according to the coordinates of the image (S50).

Furthermore, the terminal 100 generates augmented reality content to which the recognized marker and the colors of the portions of the image have been applied (S60). More specifically, the color information according to the coordinates is applied to achromatic coloring augmented reality content, provided by the server, based on the coloring of the user. In this case, the achromatic coloring augmented reality content provided by the server is adapted into coloring augmented reality content according to the coloring of the user (S60).

The coloring augmented reality content generated as described above is executed and displayed on the display unit of the user terminal (S70). In this case, if the user has associated a voice file with the coloring augmented reality content, the voice file is downloaded from the server and also played back along with the coloring augmented reality content. The voice file may be for leaving background music or contents related to coloring play in a voice form or may be a voice message that is transferred to a thirty party who has received a printed matter.

MODE FOR INVENTION

When an augmented reality service is executed, the terminal 100 outputs a recognized marker and a 3D-shaped object (for example, animals and plants, animation character or a robot) according to the colors of each of the portions of an image on a color image on a terminal screen, as shown in FIG. 6. FIG. 6 is an exemplary diagram showing an augmented reality service according to the present invention. That is, a 3D-shaped object is colored with the same color as a printed matter on the colored printed matter and served as augmented reality.

The 3D-shaped object performs various motions and behaviors according to a predetermined scenario. A user can stereoscopically (for example, front, back, left, right, top and bottom) view the 3D-shaped object spread on the color image while rotating the printed matter of the color image. The printing device according to the present invention can be easily placed on a palm and viewed while rotating it because it prints a printed matter of a size smaller than the A4 size.

Color augmented reality content generated as described above is basically provided by a server, but can further enhance a creative ability and interest by assigning an effect, such as 3D animation in which an object comes to life, because color applied by a user through coloring play has been incorporated into the 3D-shaped object of the content.

The operation of the present invention described herein may be implemented in a computer-readable recording medium using software or hardware or a combination of them.

According to a hardware implementation, the embodiment described herein may be implemented using at least one of application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and an electrical unit for executing a function. In some cases, examples of the operation described in this specification may be implemented in the form of a control unit (or a service app) itself.

According to a software implementation, embodiments, such as the procedures and functions described in this specification, may be implemented as separate software modules. Each of the software modules may execute one or more functions and operations described in this specification. Software code may be implemented by a software application written in a proper program language. The software code may be stored in memory (not shown) and executed by a control unit (or service app).

Although the present invention has been described with reference to the embodiment(s) shown in the drawings, the embodiments are merely illustrative. A person having ordinary skill in the art may understand that the present invention may be modified in various ways from the embodiments and some or all of the aforementioned embodiment(s) may be selectively combined and configured. Accordingly, the true range of protection of the present invention should be determined by the technological spirit of the following claims.

As described above, the present invention has implemented the coloring play augmented reality service system by adopting the image editing function (for example, coloring) of the user terminal 100 and the printing (print) function of the printing device 200.

The present invention can satisfy the needs of smartphone users who request easiness and convenience so that a conventional augmented reality service felt inconvenient and cumbersome by adults is made to be processed through only a smartphone.

More specifically, in the present invention, the printing device that can be easily carried and is not limited to any place is used because data is received through wireless communication with a user terminal as described above. Furthermore, editing, such as coloring, is performed in a service app of a smartphone other than a printed matter. Accordingly, coloring play and an augmented reality service can be enjoyed in a restaurant or while moving using public transportation.

INDUSTRIAL APPLICABILITY

In accordance with the present invention, an augmented reality service for existing coloring play can be used without a limit to the place. More specifically, a service that can be more easily used and interesting can be provided because a service app provides various digital image editing tools.

The invention claimed is:
1. An augmented reality service method for coloring play, comprising steps of:
   1) executing, by a user terminal, a service app and selecting and downloading an image to be colored from a server;

2) coloring the downloaded image in a specific pattern using a tool provided by the service app;
3) printing the colored image;
4) executing the service app, recognizing a marker by scanning a printed matter of the colored image, and extracting color information according to coordinates of the image;
5) generating coloring augmented reality content based on the image colored by a user by coloring augmented reality content provided by the server based on the extracted color information; and
6) displaying the coloring augmented reality content on a display unit of the user terminal.

2. The augmented reality service method of claim 1, further comprising a step of storing the image colored in the step 2) in the user terminal.

3. The augmented reality service method of claim 1, wherein the coloring augmented reality content is generated in the server or the user terminal.

4. The augmented reality service method of claim 1, wherein in the step 3), the image colored by the user is colorfully printed.

5. The augmented reality service method of claim 1, wherein:
the step 2) comprises generating, by the user, a voice file and transmitting the voice file to the server, and
the step 6) comprises playing back the voice file when the coloring augmented reality content is displayed on the display unit of the user terminal.

6. An augmented reality service system for coloring play, comprising:
a server providing various images for coloring play and augmented reality content corresponding to a corresponding image;
a user terminal comprising a service app for downloading the image in response to a selection of a user and providing a tool for allowing the user to color the image; and
a printing device printing the image colored in the service app,
wherein the service app recognizes a marker by scanning a printed matter of the colored image and extracts color information according to coordinates of the image,
the server or the service app generates coloring augmented reality content based on the image colored by the user by coloring augmented reality content provided by the server based on the extracted color information, and
the user terminal displays the coloring augmented reality content.

7. The augmented reality service system of claim 6, wherein the user terminal stores the image colored by the user in the service app.

8. The augmented reality service system of claim 6, wherein the printing device comprises short-distance wireless communication means, receives the colored image from the user terminal, and colorfully prints the received image.

* * * * *